D. N. CARLIN & O. L. GERWIG.
UNLOADING DEVICE FOR GRINDING AND MIXING MACHINES.
APPLICATION FILED JAN. 30, 1914.

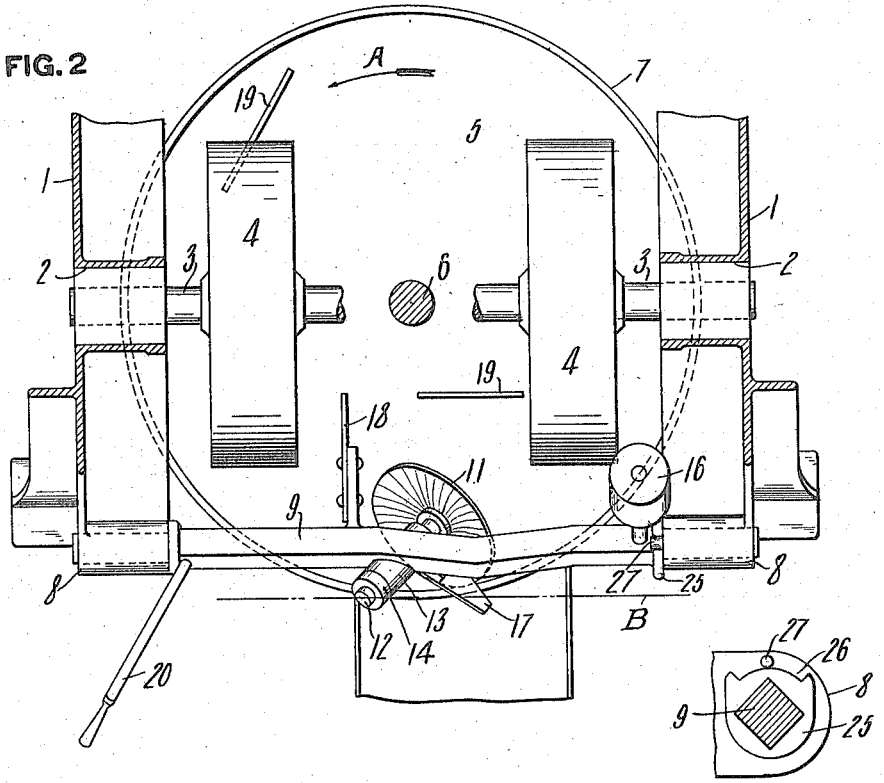
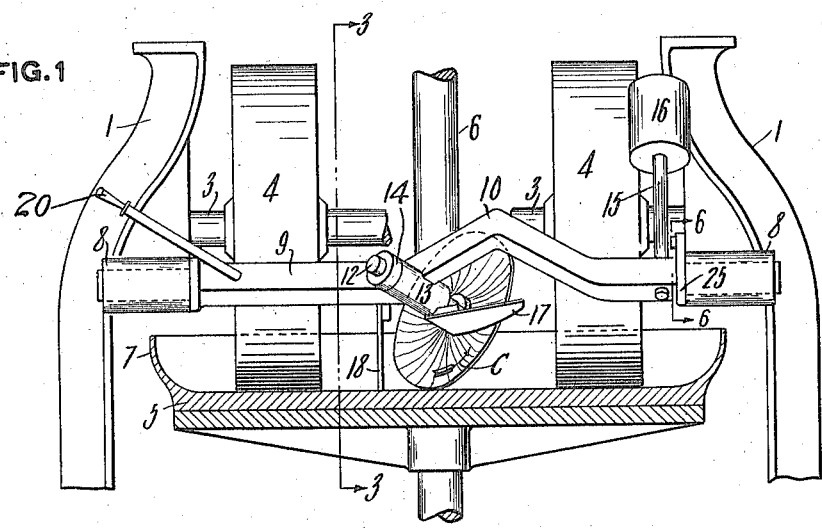

1,181,990.

Patented May 9, 1916.
2 SHEETS—SHEET 2.

WITNESSES

INVENTORS

UNITED STATES PATENT OFFICE.

DAVID N. CARLIN AND OSCAR L. GERWIG, OF PITTSBURGH, PENNSYLVANIA, ASSIGNORS TO THOMAS CARLIN SONS COMPANY, A CORPORATION OF PENNSYLVANIA.

UNLOADING DEVICE FOR GRINDING AND MIXING MACHINES.

1,181,990.      Specification of Letters Patent.      Patented May 9, 1916.

Application filed January 30, 1914. Serial No. 815,547.

*To all whom it may concern:*

Be it known that we, DAVID N. CARLIN and OSCAR L. GERWIG, residents of Pittsburgh, in the county of Allegheny and State of Pennsylvania, have invented a new and useful Improvement in Unloading Devices for Grinding and Mixing Machines, of which the following is a specification.

This invention relates to grinding or mixing mills or pans, such as are used for grinding ores, for working up clay, or for mixing and crushing molder's sand and like materials.

The invention has particular reference to the unloading or discharging devices for removing the ground or mixed material from the pan.

The object of the invention is to provide a mixing mill or pan embodying a disk conveyer or unloading device which is simple and effective in operation, which is easily manipulated, which is driven or operated by the rotating pan, which is durable and not liable to get out of order, which is so arranged that it may be placed and will stay either in operative or inoperative position, and which leaves the front of the mill open and unobstructed so that it may be readily loaded and the material may be discharged directly therefrom into a bucket, wagon, or other receptacle.

Another object of the invention is to provide a mixing mill embodying a concavo-convex disk conveyer or unloading device which scoops up the material from the bottom of the pan, said conveyer being movably supported above the pan and within its periphery, and movable deflectors for guiding the material onto the conveyer and over the edge of the pan.

Other objects of the invention are in part obvious and in part will appear more in detail hereinafter.

Figure 3:
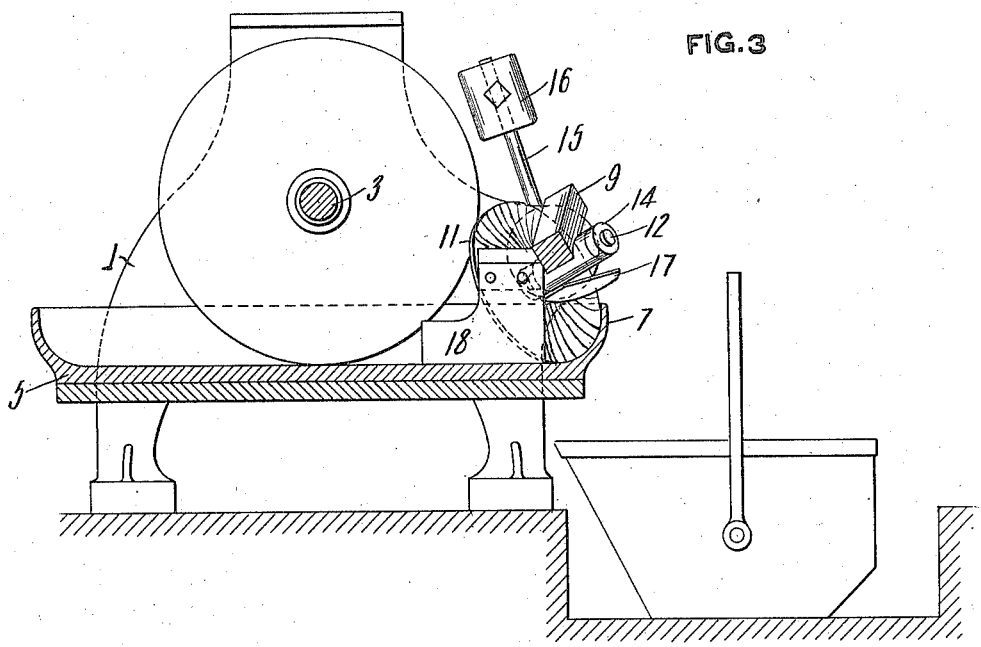
Figure 4:
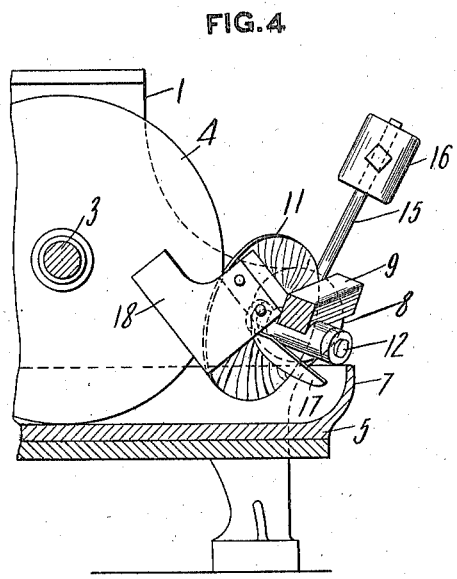
Figure 5:
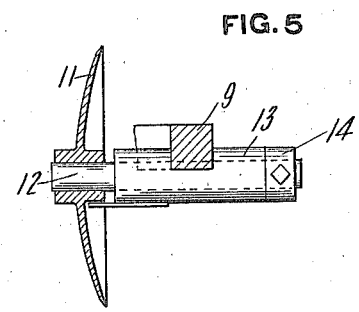

In the drawings, which represent one embodiment of the invention, Figure 1 is a front elevation, parts of the frame and driving mechanism being omitted, and showing the pan in section; Fig. 2 is a plan view of the same; Fig. 3 is a sectional elevation on the line 3—3, Fig. 1, and showing the conveyer in operative position; Fig. 4 is a detail view corresponding to Fig. 3 and showing the conveyer in inoperative position; Fig. 5 is a detail sectional view of the disk conveyer and its support; and Fig. 6 is a detail cross section on the line 6—6, Fig. 1.

The machine shown in the drawings comprises a suitable frame 1 which may be of any type or construction and which, as shown, embodies end members provided with vertical guideways 2 in which travel journal blocks for a shaft or shafts 3, upon which are loosely rotatable the mixing or grinding rollers 4. Said rollers are held down by gravity or by springs against the bottom of a circular pan 5, carried by a central vertical shaft 6, which is rotated positively by any suitable driving means (not shown). Said pan is provided with an outer wall or rim 7 which may be integral therewith or otherwise rigidly secured thereto, and which is continuous around the entire periphery of the pan and is arched or curved outwardly and upwardly, so that the pan is in the form of a wide dish with a flat bottom and a curved inner peripheral surface.

The end members of the frame 1 are provided with suitable journal bearings 8 for the opposite ends of a rail 9 which extends across the front of the machine above the pan 5 and which is provided with a suitable operating handle 20. Intermediate its ends, rail 9 is offset upwardly or to one side, as at 10, to provide clearance for the disk conveyer 11, which is fixed to rotate with a short shaft 12 loosely journaled in a suitable bearing 13 on the rail 9. Shaft 12 is preferably provided with a collar 14 at the upper end of the bearing 13 to prevent the shaft from dropping out. At one end, rail 9 is provided with an upright arm 15 carrying a counterweight 16, said arm being inclined so that the counterweight holds the conveyer disk either down in contact with the inner surface of the pan in the operative position shown in Fig. 3, or in the inoperative position shown in Fig. 4, where the disk is lifted out of contact with the pan bottom. Preferably, rail 9 is provided with a flange or collar 25 which is cut away or notched, as at 26, to provide a shoulder for coöperation with a stop pin 27 on the main frame and which limits tilting movement of the rail in both directions.

In the operative position of the conveyer disk the axis of shaft 12 is askew or inclined in two directions. First, as shown in Fig. 1, it is inclined downwardly toward the pan in the direction of its rotation, indicated by the arrow A in Fig. 2. Second, it is inclined inwardly toward the axis of rotation of the pan in the direction of its rotation and with respect to a tangent to the edge of the pan drawn substantially opposite the lower end of the shaft 12, such as the tangent line B, Fig. 2.

The inner surface of the pan 7 is curved to correspond with the projected curvature of the edge of the disk or conveyer 11, when the latter is in its lower or operative position indicated in Fig. 3. The curvature depends upon the size of the disk and the particular angles of inclination of shaft 12. The position of said shaft and the curvature of the pan are determined by experiment and are affected by various factors, such as the weight and consistency of the material being worked, etc.

The conveyer disk 11 is either a cast or sheet metal member and concavo-convex in cross section, as shown in Fig. 5, with its concave side facing backward in the direction of rotation of the pan, so that when lowered it acts like a plow and scoops up the approaching stream of material. The rail 9 has rigidly secured thereto a scraper or guide 17, which may be attached to a suitable portion of the journal bearing 13 or any other part, and whose edge is shaped to conform to the concave back surface of the disk 11. Said guide is inclined upwardly and outwardly, as shown in Fig. 3, and projects slightly beyond the periphery of the pan 5. It directs the material carried upwardly by the disk conveyer over the edge of the mixing pan and discharges it therefrom. Rail 9 also is provided with a suitable bracket carrying a guide or deflector 18, which in the operative position of the conveyer mechanism extends toward the center of the pan and contacts with the pan bottom and directs the material traveling with the bottom of the pan upon the outer half of the disk conveyer 11. When the disk is raised to inoperative position, as shown in Fig. 4, the deflector 18 is out of contact with the material and does not interfere with the proper mixture or working thereof. Other fixed deflectors, shown at 19, may also be placed at various locations in the pan to assist in thoroughly kneading the material in the usual manner.

In operation, the sand, ore, clay or other material to be worked is placed in the pan with the liquid, such as water, molasses or other liquid to be incorporated therewith. The pan is rotated in the direction of arrow A, Fig. 2. The disk conveying mechanism is placed in inoperative position, shown in Fig. 4, by pressing down upon the handle 20. In this position the counterweight 16 is at the right of the axis of rail 9 in Fig. 4, with the pin 27 at one end of notch 26, which holds the disk elevated. As the pan rotates the material is deflected beneath rollers 4 by the guides 19 and is thoroughly mixed or crushed and incorporated with the liquid. When the material is sufficiently worked, lever 20 is lifted to oscillate the conveying mechanism to the left in Fig. 4, until the parts assume the operative position, shown in Fig. 3, with the edge of the disk in full contact with the bottom and curved peripheral surface of the pan and the guide 18 in position to direct the material upon said disk. The disk conveyer is frictionally rotated by contact with the pan in the direction of the arrow C with its outer portion moving upwardly. It scoops up the material from the bottom of the pan and carries it upwardly against the deflector 17 which scrapes it off from the disk conveyer and guides it over the edge of the pan. In the operative position of the unloading devices the counterweight 16 is at the left of the axis of shaft 9, Fig. 3, and holds the disk 11 and deflector 18 in contact with the pan surface, but the weight of the material pressing downwardly against the conveyer disk also tends to move the disk more closely into contact with the surface of the pan. The disk also swings about a horizontal axis which is above the pan and which preferably is above the lowest point on the periphery of the disk, so that the material has a tendency to swing the disk out toward the curved surface of the pan. It is therefore self-adjusting and automatically compensates for its own wear by the materials being worked.

The axis of rail 9 lies between the periphery and the central vertical axis of the pan and the conveying disk and its immediately associated parts are all located within the periphery of the pan, so that the front of the mill is left open and unobstructed. This permits ready access to the front of the machine for inspection, for repairs, or for loading or unloading the same. More particularly, it permits the material to be discharged from the mill directly into a suitable receptacle for carrying it to a distance, such as a car or wagon, or the bucket 21, which can be carried by a crane into position directly in front of the machine. The operating handle for the conveying devices is at the front and near the end of the machine, so the disk can be readily manipulated even when a bucket or wagon is in position at the front of the machine. It will also be observed that the thrust of the material upon the conveyer disk, when unloading the machine, is in the direction of the length of the rail 9 and toward one of the end bearings thereof. This reduces wear and friction and makes it easy to swing the disk to one or the other of its two positions.

What we claim is:

1. A machine of the character described, comprising a frame having end members, a rotatable pan, a horizontal rail journaled in the end frame members and lying above said pan, a disk conveyer loosely rotatable on said rail and having its outer edge fitting the inner surface of said pan, and a counterweight connected to said rail and arranged to hold said disk either in operative or in inoperative position.

2. A machine of the character described, comprising a rotary pan, a rail journaled on a horizontal axis and lying between the periphery and center of said pan, a rotatable disk conveyer carried by said rail and having operative and inoperative positions, and a counterweight located above said rail and rigidly connected thereto and thereby arranged to hold said disk conveyer in either of said positions.

3. A machine of the character described, comprising a rotary pan, a rail journaled on a horizontal axis and lying between the periphery and center of said pan, a bearing rigid with said rail, a disk conveyer journaled loosely in said bearing, and a guide carried by said rail and movable therewith and arranged when the disk is lowered to deflect material from the pan bottom upon the surface of the disk.

4. A machine of the character described, comprising a rotary pan, a rail journaled on a horizontal axis and lying between the periphery and center of said pan, a rotatable disk conveyer carried by said rail and having operative and inoperative positions, and an arm rigidly connected to said rail and extending upwardly therefrom and provided with a counterweight on its upper end, said arm being so arranged that said counterweight lies on opposite sides of a vertical plane through said rail in the two positions of said conveyer.

5. A machine of the character described, comprising a rotary pan, a rail journaled on a horizontal axis and lying between the periphery and center of said pan, a rotatable disk conveyer carried by said rail and having operative and inoperative positions, an arm rigidly connected to said rail and extending upwardly therefrom and provided with a counterweight on its upper end, said arm being so arranged that said counterweight lies on opposite sides of a vertical plane through said rail in the two positions of said conveyer, and stop devices coöperating with said rail for locating said conveyer in its said two positions.

In testimony whereof, we have hereunto set our hands.

DAVID N. CARLIN.
OSCAR L. GERWIG.

Witnesses:
ELBERT L. HYDE,
WILLIAM B. WHARTON.

Copies of this patent may be obtained for five cents each, by addressing the "Commissioner of Patents, Washington, D. C."